United States Patent
Demianovich et al.

(12) 
(10) Patent No.: US 10,662,818 B2
(45) Date of Patent: May 26, 2020

(54) GAS TURBINE MANNEQUIN

(71) Applicant: General Electric Company, Schenectady, NY (US)

(72) Inventors: Nicholas Demianovich, Greenville, SC (US); Jean-Marie Deschamps, Belfort (FR); Keegan Saunders O'Donnell, Greenville, SC (US); Jeffrey Patrick Mills, Greenville, SC (US)

(73) Assignee: General Electric Company, Schenectady, NY (US)

( * ) Notice: Subject to any disclaimer, the term of this patent is extended or adjusted under 35 U.S.C. 154(b) by 78 days.

(21) Appl. No.: 15/997,724

(22) Filed: Jun. 5, 2018

(65) Prior Publication Data

US 2019/0017415 A1  Jan. 17, 2019

(30) Foreign Application Priority Data

Jul. 13, 2017  (EP) .................................... 17305924

(51) Int. Cl.
*F01D 25/28* (2006.01)
*F16M 3/00* (2006.01)
*F16M 5/00* (2006.01)

(52) U.S. Cl.
CPC .......... *F01D 25/28* (2013.01); *F01D 25/285* (2013.01); *F16M 3/00* (2013.01); *F16M 5/00* (2013.01); *F05D 2220/32* (2013.01); *F05D 2230/64* (2013.01); *F05D 2230/68* (2013.01); *F05D 2230/70* (2013.01); *F05D 2230/72* (2013.01); *F05D 2240/91* (2013.01)

(58) Field of Classification Search
CPC ......... F01D 25/28; F01D 25/285; F16M 5/00; F16M 3/00; F16M 13/00; F05D 2230/72; F05D 2230/70; F05D 2230/68; F05D 2240/91; F05D 2230/64; F05D 2220/32; F02C 7/32; F02C 7/20

See application file for complete search history.

(56) References Cited

U.S. PATENT DOCUMENTS

| 5,575,145 A | 11/1996 | O'Neill et al. |
| 2015/0184591 A1* | 7/2015 | Giancotti ................ F01D 25/28 |
| | | 60/798 |

(Continued)

FOREIGN PATENT DOCUMENTS

EP  1 052 377 A2  11/2000

OTHER PUBLICATIONS

Extended European Search Report and Opinion issued in connection with corresponding EP Application No. 17305924.7 dated Jan. 4, 2018.

*Primary Examiner* — Jun S Yoo
(74) *Attorney, Agent, or Firm* — Dority & Manning, P.A.

(57) ABSTRACT

A method of constructing a gas turbine system may include placing a foundation interface of a gas turbine mannequin on a foundation, aligning the gas turbine mannequin with a load and connecting the gas turbine mannequin to the load. The method may include constructing a pipeline and connecting the pipeline to the gas turbine mannequin. The method may include placing a foundation interface of a gas turbine mannequin on a foundation, aligning the gas turbine mannequin with an exhaust structure and connecting the gas turbine mannequin to the exhaust structure. The method also includes removing the gas turbine mannequin and installing a gas turbine.

9 Claims, 11 Drawing Sheets

(56) References Cited

U.S. PATENT DOCUMENTS

2016/0047278 A1* 2/2016 Edwards .............. F01D 25/285
                                                      248/542
2017/0051667 A1* 2/2017 Godman ................ F01D 25/28
2017/0350278 A1* 12/2017 Reddy Asani ........... F16M 1/04
2018/0371949 A1* 12/2018 Kutnjak ................ F01D 15/10

* cited by examiner

GAS TURBINE MANNEQUIN

FIELD

The present disclosure generally involves a gas turbine mannequin and related methods of using the mannequin in construction of a gas turbine plant.

BACKGROUND

A gas turbine plant includes a gas turbine and various associated pipelines and other accessories. Construction of a gas turbine plant includes placement of the gas turbine, alignment of the system, and construction of various pipelines on and around the gas turbine. Typically, the gas turbine must be in place before the various accessories can be placed, the system can be aligned, and the pipelines can be constructed.

In situations where the delivery of the gas turbine to a plant is delayed, the entire construction schedule may consequently be delayed. For example, it may not be feasible to construct pipelines which are to be connected to the gas turbine without the gas turbine itself present when such pipelines rely on the gas turbine for structural support.

BRIEF DESCRIPTION

Aspects and advantages are set forth below in the following description, or may be obvious from the description, or may be learned through practice.

According to one example embodiment, a method of constructing a gas turbine system is provided. The method includes placing a foundation interface of a gas turbine mannequin on a foundation, aligning the gas turbine mannequin with a load, aligning the gas turbine mannequin with an exhaust structure, and connecting the gas turbine mannequin to the load and the exhaust structure. The method also includes removing the gas turbine mannequin and installing a gas turbine.

In accordance with another example embodiment, a method of constructing a gas turbine system is provided. The method includes constructing a pipeline, aligning the pipeline with one or more blind flanges of a gas turbine mannequin, and connecting the pipeline to the one or more blind flanges of the gas turbine mannequin. The method also includes removing the gas turbine mannequin and installing a gas turbine.

In accordance with another example embodiment, a gas turbine mannequin for constructing a gas turbine system is provided. The gas turbine system includes a load, an exhaust structure, a gas turbine positioned on a foundation, and at least one pipeline assembly in fluid communication with the gas turbine. The gas turbine of the gas turbine system includes a shaft in operative communication with the load and an exhaust section in fluid communication with the exhaust structure. The gas turbine mannequin includes a forward end, an aft end, and a structural skeleton extending along an axial direction between the forward end and the aft end. The structural skeleton is configured for supporting the at least one pipeline assembly. The gas turbine mannequin also includes a foundation interface positioned below the structural skeleton along a vertical direction. The foundation interface is configured for adjustably fastening to a plurality of anchor bolts in the foundation. The gas turbine mannequin also includes a plurality of blind flanges circumferentially arranged about the structural skeleton. The plurality of blind flanges is configured for connecting to the at least one pipeline assembly.

Those of ordinary skill in the art will better appreciate the features and aspects of such embodiments, and others, upon review of the specification.

BRIEF DESCRIPTION OF THE DRAWINGS

A full and enabling disclosure of the present embodiments, including the best mode thereof to one skilled in the art, is set forth more particularly in the remainder of the specification, including reference to the accompanying figures, in which.

DETAILED DESCRIPTION

Reference will now be made in detail to various embodiments, one or more examples of which are illustrated in the accompanying drawings. The detailed description uses numerical and letter designations to refer to features in the drawings. Like or similar designations in the drawings and description have been used to refer to like or similar parts. As used herein, the terms "first", "second", and "third" may be used interchangeably to distinguish one component from another and are not intended to signify location or importance of the individual components. The terms "upstream" or "forward" and "downstream" or "aft" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component, and the term "axially" refers to the relative direction that is substantially parallel to an axial centerline of a particular component.

Each example is provided by way of explanation, not limitation. In fact, it will be apparent to those skilled in the art that modifications and variations can be made in the present embodiments without departing from the scope or spirit thereof. For instance, features illustrated or described as part of one embodiment may be used on another embodiment to yield a still further embodiment. Thus, it is intended that the present embodiments cover such modifications and variations as come within the scope of the appended claims and their equivalents. Although exemplary embodiments will be described generally in the context of a land based power generating gas turbine for purposes of illustration, one of ordinary skill in the art will readily appreciate that embodiments may be applied to any type of turbomachine, such as a steam turbine, a marine gas turbine, or aircraft gas turbine, and that embodiments are not limited to land based power generating gas turbine components unless specifically recited in the claims.

As will be described in more detail hereinbelow, a gas turbine mannequin is provided. The gas turbine mannequin may serve as a template or guide for installation of one or more pipelines to be associated with the actual gas turbine in the absence of the actual gas turbine itself. The gas turbine mannequin may provide structural support to the pipelines when the actual gas turbine is not yet available or in place. Further, the gas turbine mannequin may include a foundation interface and other features which permit alignment with a load and/or exhaust diffuser.

Figure 1:
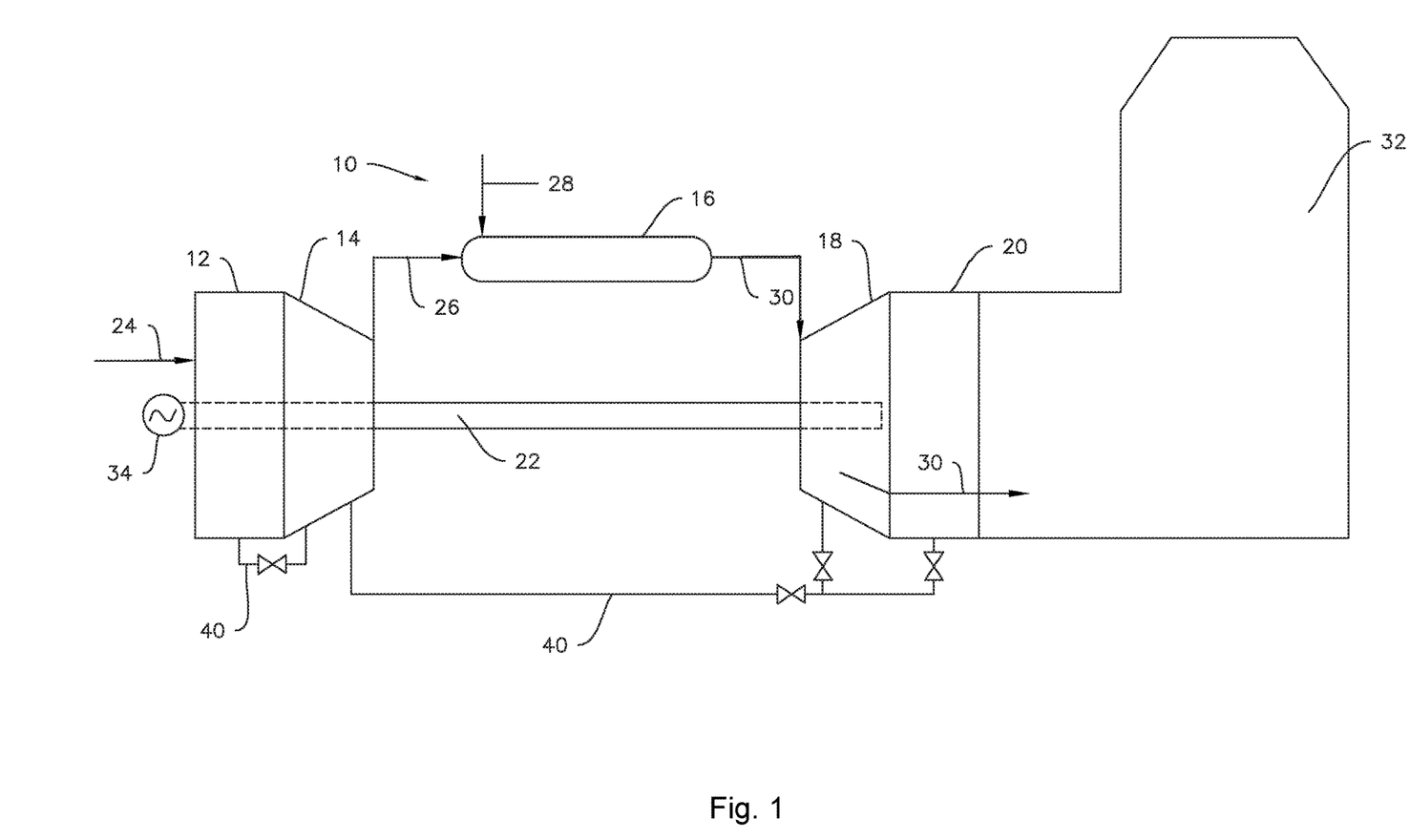
FIG. 1 is a schematic view of a gas turbine system which may be constructed using methods according to one or more embodiments of the present disclosure.

Referring now to the drawings, wherein identical numerals indicate the same elements throughout the figures, FIG. 1 illustrates a schematic diagram of an exemplary gas turbine system. The gas turbine system includes a gas turbine 10 connected to a load 34 and an exhaust structure 32. The gas turbine 10 generally includes an inlet section 12, a compressor 14 disposed downstream of the inlet section 12, at least one combustor 16 disposed downstream of the compressor 14, a turbine 18 disposed downstream of the combustor 16 and an exhaust section 20 disposed downstream of the turbine 18. Additionally, the gas turbine 10 may include one or more shafts 22 that couple the compressor 14 to the turbine 18. The gas turbine 10 may have various pipelines 40 extending around the gas turbine 10 to provide fluid, e.g., fuel, air, or lubricants, to and/or from various components of the gas turbine 10.

During operation, air 24 flows through the inlet section 12 and into the compressor 14 where the air 24 is progressively compressed, thus providing compressed air 26 to the combustor 16. At least a portion of the compressed air 26 is mixed with a fuel 28 within the combustor 16 and burned to produce combustion gases 30. The combustion gases 30 flow from the combustor 16 into the turbine 18, wherein energy (kinetic and/or thermal) is transferred from the combustion gases 30 to rotor blades (not shown), thus causing shaft 22 to rotate. The mechanical rotational energy may then be used for various purposes such as to power the compressor 14 and/or to generate electricity. For example, the shaft 22 may be connected to a load 34 such as the generator depicted in FIG. 1. The combustion gases 30 exiting the turbine 18 may then be exhausted from the gas turbine 10 via the exhaust section 20. The exhaust section 20 may be in fluid communication with an exhaust structure 32, e.g., the exhaust section 20 may be connected to an exhaust diffusor and/or an exhaust stack, as illustrated for example in FIG. 1.

Some of the compressed air 26 may be used for cooling various components of the gas turbine 10 which are subjected to high temperatures. Accordingly, pipelines 40 may be constructed on and around the gas turbine 10 to route a cooling portion of the compressed air 26 from the compressor 14 around or over the combustor 16 to other parts of the gas turbine 10, such as the turbine section 18 and/or the exhaust section 20. For example, the compressor 14 may include multiple stages, and one or more stage may be in fluid communication with a pipeline 40 which diverts a cooling portion of the compressed air 26 to the turbine section 18 and/or exhaust section 20.

The gas turbine 10 may also be configured for inlet bleed heating in order to provide compressor pressure ratio protection. Inlet bleed heating includes bleeding off of discharge air 26 from the compressor 14 and re-circulating the bleed air back to the inlet section 12. This raises the inlet temperature of ambient air entering the compressor inlet by mixing the bleed portion of the hot compressor discharge air with the colder ambient air, thereby reducing the air density and the mass flow to the gas turbine. The inlet bleed heat system may include a bleed air manifold which feeds multiple feed pipes. Accordingly, in some embodiments, the pipelines 40 may include feed pipes for an inlet bleed heat system.

Figure 2:
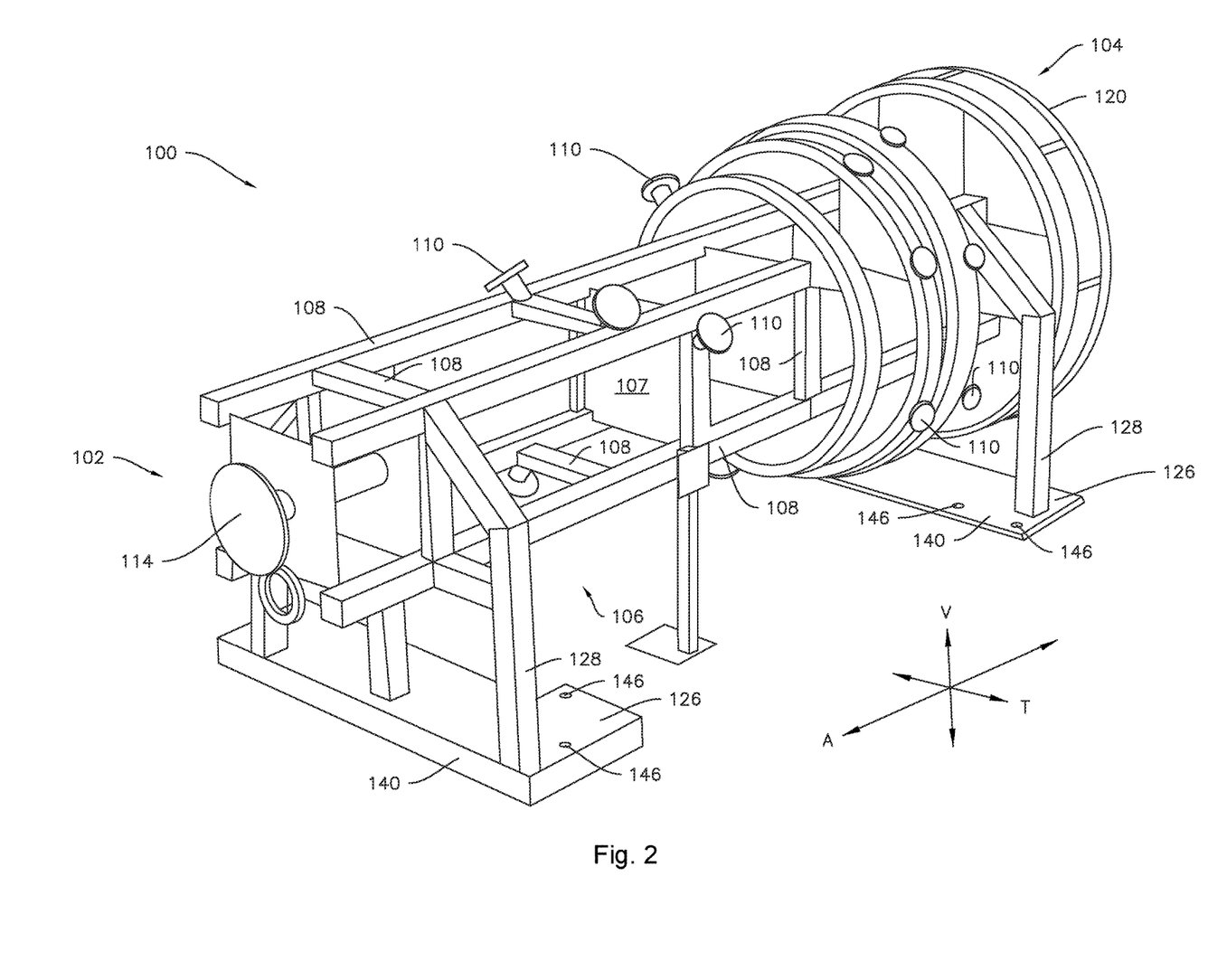
FIG. 2 is a perspective view of a gas turbine mannequin according to one or more embodiments of the present disclosure.
Figure 3:
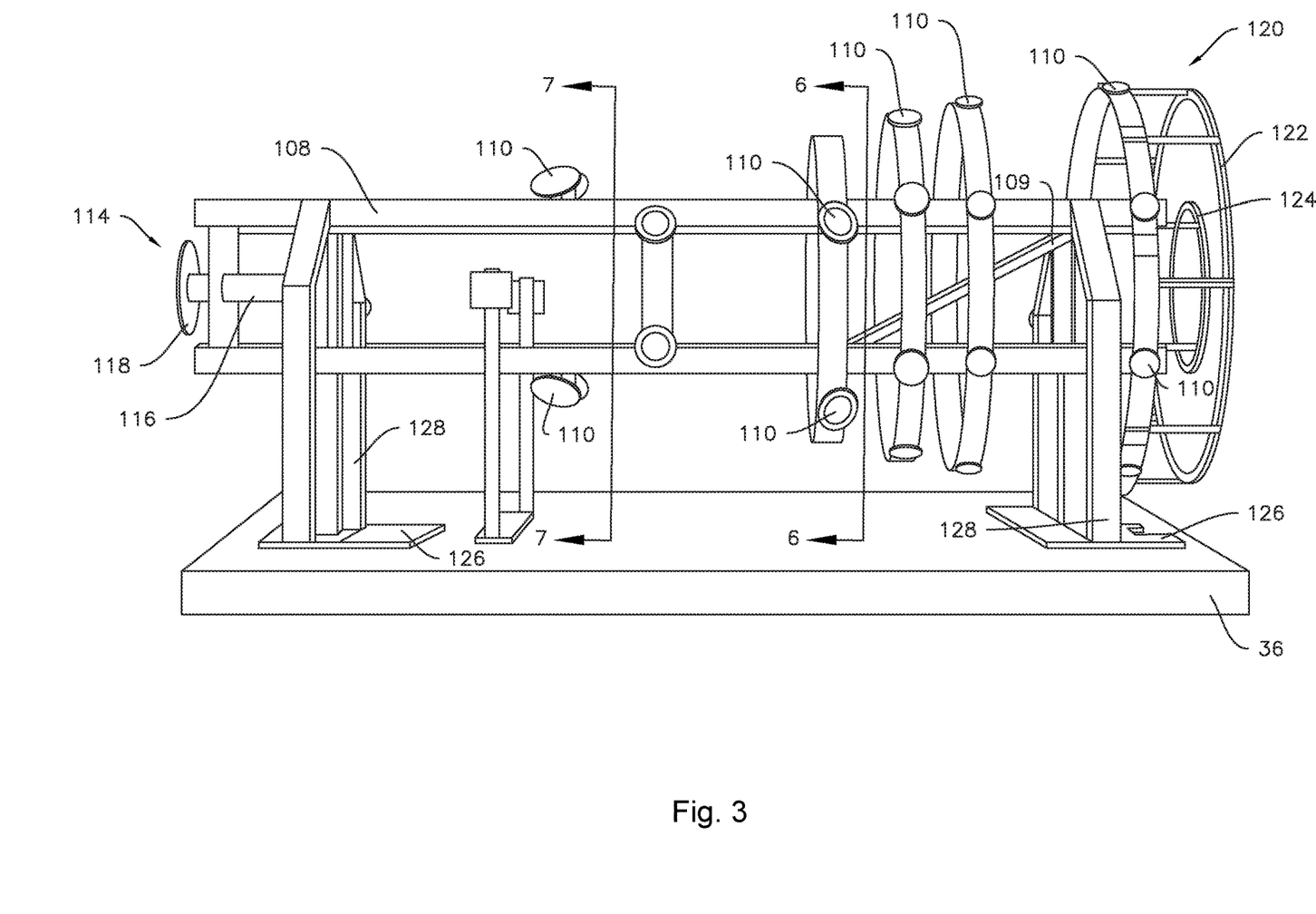
FIG. 3 is a side view of the gas turbine mannequin of FIG. 2.

Turning now to FIG. 2, an example embodiment of a gas turbine mannequin 100 is illustrated. The gas turbine mannequin 100 comprises a forward end 102 and an aft end 104 with a structural skeleton 106 extending along an axial direction A between the forward end 102 and the aft end 104. The structural skeleton 106 may be used to provide structural support for the weight of a pipeline 40 which may be connectable to a gas turbine 10. The structural skeleton 106 of the gas turbine mannequin 100 may include a plurality of elongate members 108. For example, some of the elongate members 108 may be horizontally oriented, e.g., along the axial direction A or a transverse direction T, and may sometimes be referred to as beams, while others of the elongate members 108 may be vertically oriented, e.g., along the vertical direction V, and may sometimes be referred to as posts. In some embodiments, the structural skeleton 106 may also include additional members, such as plates 107 and/or cross-braces 109 (FIG. 3).

In some embodiments, the gas turbine mannequin 100 may simulate one or more portions of the gas turbine 10 to permit construction and installation of pipelines 40. The cooling pipelines and the inlet bleed heat feed pipes described hereinabove are just two examples of pipelines 40, any pipeline or combination of pipelines associated with a gas turbine system may be included. Such pipelines 40 generally connect to various flange fittings at several locations on the gas turbine 10. Accordingly, the gas turbine mannequin may include one or more groups of blind flanges 110 to simulate the connection points. Each group of blind flanges 110 may include a plurality of blind flanges 110 circumferentially arranged about the structural skeleton 106. The plurality of blind flanges 110 and the structural skeleton 106 may collectively provide connection points and structural support for one or more pipelines 40. The plurality of blind flanges 110 may be axially aligned and extend radially outward from the structural skeleton 106. For example, the pipelines 40 may include cooling pipelines, as described above, which connect to a particular stage of a multi-stage compressor, and a first plurality of blind flanges 110 may be axially aligned on the mannequin 100 at an axial location corresponding to the particular stage of the multi-stage compressor to which the cooling pipeline will connect when the gas turbine 10 is installed. Thus, the cooling pipeline may be assembled and connected to the blind flanges 110 of the first plurality of blind flanges 110 of the gas turbine mannequin 100.

Embodiments may include a method of constructing a gas turbine system. In some embodiments, the method may include constructing a pipeline 40, e.g., by joining together a plurality of individual pipes. The pipeline 40 may then be connected to one or more blind flanges 110 of the gas turbine mannequin 100. When the gas turbine 10 is available, the method may then include removing the gas turbine mannequin 100 and installing the gas turbine 10. Where the blind flanges 110 are located on the gas turbine mannequin 100 to correspond to the location of flanges on the gas turbine 10, assembling and connecting the pipeline 40 to the blind flanges 110 allows the length and orientation of pipeline 40 to be verified in the absence of the gas turbine 10. The gas turbine mannequin 100 may then serve as a stand-in for the gas turbine 10 itself, e.g., providing structural support for the pipeline 40 until such time as the gas turbine mannequin 100 may be removed and the gas turbine 10 installed. In some embodiments, connecting the pipeline 40 to the one or more blind flanges 110 of the gas turbine mannequin 100 may include fastening an end of the pipeline 40 to the one or more blind flanges 110. Accordingly, in such embodiments the method may include disconnecting the pipeline 40 from the one or more blind flanges 110, e.g., prior to removing the gas turbine mannequin 100. Such embodiments may also include disconnecting the pipeline 40 from the one or more blind flanges 110 of the gas turbine mannequin such that the plurality of individual pipes of the pipeline 40 remain joined together. In some embodiments, removing the gas turbine mannequin 100 may also include partially disassembling the gas turbine mannequin 100. In some embodiments, installing the gas turbine 100 may include connecting the pipeline 40 to the gas turbine 10 while the plurality of individual pipes of the pipeline 40 remain joined together, e.g., without disassembling the pipeline 40. In some embodiments, the pipeline 40 may be removed or relocated when removing the gas turbine mannequin 100, e.g., in order to provide installation clearance for the gas turbine 10, such embodiments may also include removing or relocating the pipeline 40 without disassembling the pipeline 40, e.g., such that the plurality of individual pipes of the pipeline 40 remain joined together during removal of the gas turbine mannequin 100 and installation of the gas turbine 10.

In some embodiments, the gas turbine mannequin 100 may simulate one or more portions of the gas turbine 10 to permit alignment with the load 34 and/or exhaust structure 32. For example, the gas turbine mannequin 100 may include a mock rotor 114 to permit alignment of the gas turbine mannequin 100 and the load 34. As another example, the gas turbine mannequin may include an annular frame 120 to permit alignment of the gas turbine mannequin 100 and the exhaust structure 32. The foregoing examples are described in more detail hereinbelow.

As may be seen in FIGS. 2 and 3, a mock rotor 114 may be positioned at the forward end 102. The mock rotor 114 may include a shaft segment 116 rotatably connected to one or more of the elongate structural members 108 and a flange member 118 configured for connecting to the same load 34 as the gas turbine 10 will be connected to, e.g., an electric generator. The term "mock rotor" is used to distinguish the mock rotor 114 of the gas turbine mannequin 100 from an actual rotor shaft of a gas turbine. For example, the mock rotor 114 is not necessarily connected to any rotor assemblies such as rotor wheels or disks and/or rotor blades. The mock rotor 114 may extend over a portion of the gas turbine mannequin 100, as opposed to extending fully between the forward end 102 and the aft end 104. However, although it is preferred to minimize the weight and complexity of the gas turbine mannequin 100, e.g., by not including rotor assemblies and minimizing the length of the mock rotor 114, such is not necessarily required. For example, in some embodiments, the mock rotor 114 may extend entirely across the length of the gas turbine mannequin 100 which may provide more accurate simulation of the gas turbine 10 when aligning the gas turbine mannequin 100 to the load 34. As another example, in some embodiments, the mock rotor 114 may have one or more rotor assemblies mounted thereon, which may provide reference points for installing pipelines 40 or other accessories.

Still with reference to FIGS. 2 and 3, an annular frame 120 may be positioned at the aft end 104. The annular frame 120 may be configured for connecting to an exhaust structure 32 (FIG. 1). In some embodiments, the annular frame 120 may include an outer ring 122 and an inner ring 124. In such embodiments, the outer ring 122 and the inner ring 124 may be configured for connecting to the exhaust structure 32. In some embodiments, the annular frame 120 may include a plurality of blind flanges 110 disposed around the outer ring 122. As may be seen in FIGS. 2 and 3, the annular frame 120 is preferably an open frame, e.g., the annular frame 120 is not enclosed and not air tight, such that the annular frame 120 is relatively light weight and relatively quick and easy to assemble. As used in the foregoing, "relatively" is with reference to a gas turbine 10, e.g., the annular frame 120 may be relatively light weight in that it weighs less than the exhaust section 20 of a gas turbine 10.

As shown in FIG. 3, the gas turbine mannequin 100 may be configured for mounting on a foundation 36, e.g., a concrete pad. For example, the gas turbine mannequin 100 may include a foundation interface 126 positioned below the structural skeleton 106 along the vertical direction V. The foundation interface 126 may be configured for adjustably fastening to a plurality of anchor bolts 38 (FIGS. 11 and 12) in the foundation 36. As shown in FIG. 3, the foundation interface 126 may include a horizontal plate 140, e.g., a plate 140 oriented such that a length and a width of the plate 140 lie in a plane defined by the axial direction A and the transverse direction T, while a thickness of the plate 140 is much smaller than either the length or the width of the plate 140 and the thickness of the plate 140 is oriented along the vertical direction V. Further, as illustrated for example in FIG. 3, in some embodiments, the foundation interface 126 may include more than one coplanar horizontal plates 140. In other embodiments, the foundation interface 126 may comprise a single horizontal plate 140. In still further embodiments, the gas turbine mannequin 100 may include only a portion of the structure illustrated, e.g., the foundation interface 126 may include only one of the multiple horizontal plates 140 depicted in the illustrative examples of FIGS. 2 and 3, for example in combination with only one of the mock rotor 114 or the annular frame 120. The horizontal plate or plates 140 of the foundation interface 126 may be connected to the structural skeleton 106 by vertical legs 128. The foundation interface 126 may also include a plurality of apertures 146 in each horizontal plate 140, each aperture 146 of the plurality of apertures 146 may be configured for receiving a respective one of the plurality of anchor bolts 38.

Figure 11:
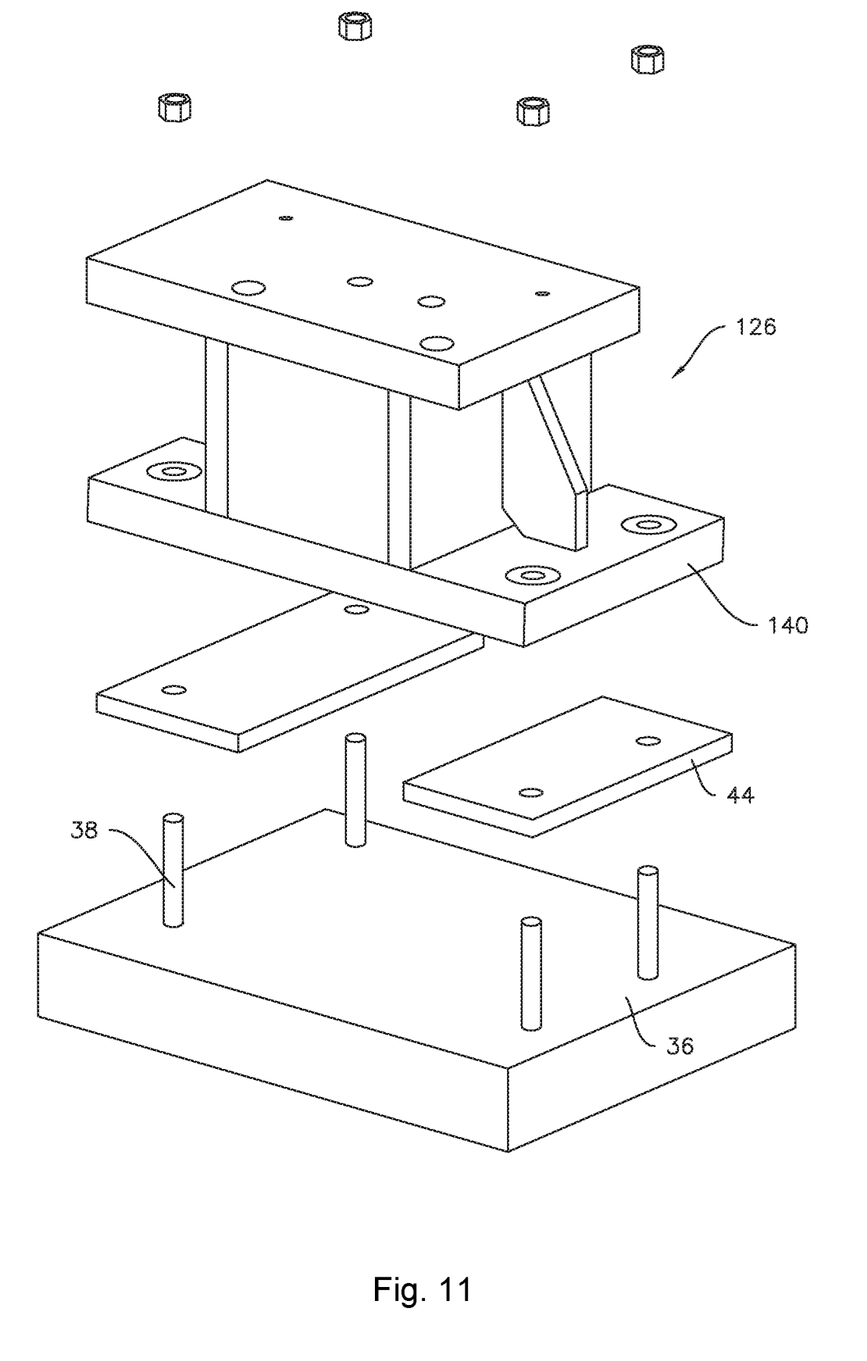
FIG. 11 is an enlarged view of a portion of a gas turbine mannequin according to one or more embodiments of the present disclosure.
Figure 12:
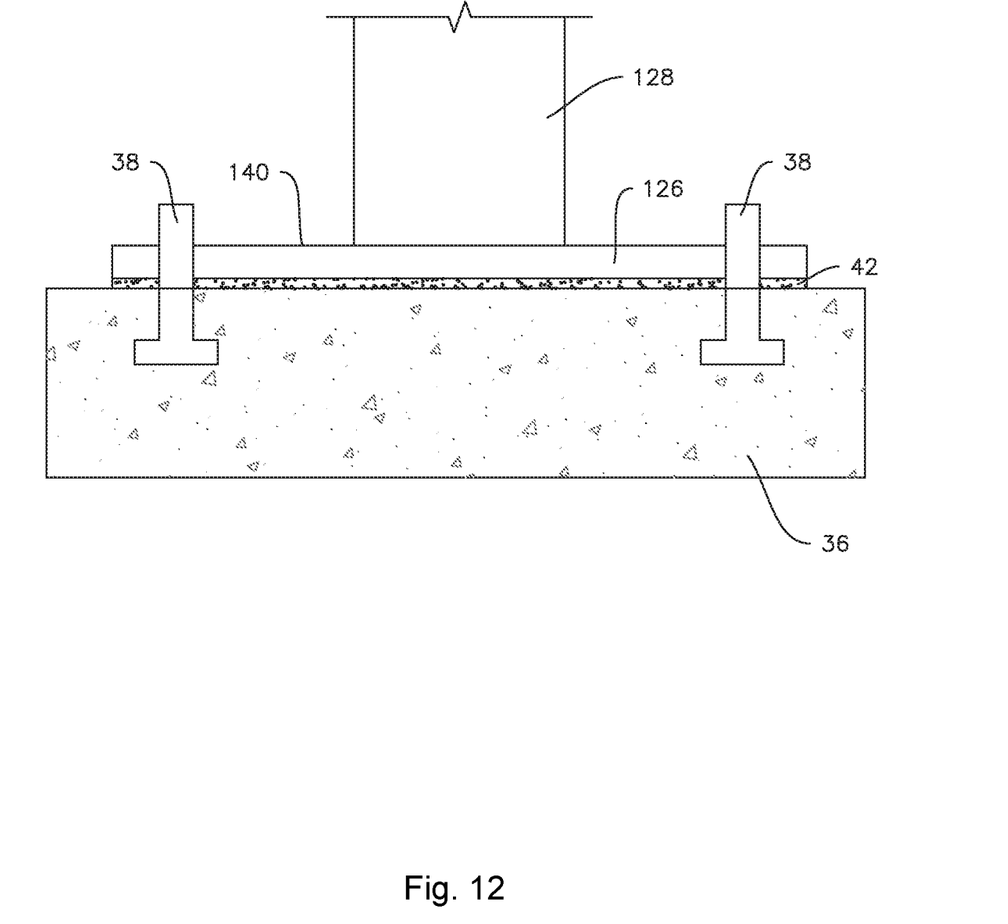
FIG. 12 is an enlarged view of a portion of a gas turbine mannequin according to one or more embodiments of the present disclosure.

Embodiments may include a method of constructing a gas turbine system. In some embodiments, the method may include placing a foundation interface 126 of a gas turbine mannequin 100 on a foundation 36. In some embodiments, the method may also include connecting the gas turbine mannequin 100 to a load 34. Connecting the gas turbine mannequin 100 to the load 34 may include connecting the mock rotor 114 of the gas turbine mannequin 100 to the load 34. In some embodiments, the method may also include connecting the gas turbine mannequin 100 to an exhaust structure 32. Connecting the gas turbine mannequin 100 to the exhaust structure 32 may include connecting the annular frame 120 of the gas turbine mannequin 100 to the exhaust structure 32. In various embodiments, the method may include aligning the gas turbine mannequin 100 with the load 34 and may also or instead include aligning the gas turbine mannequin 100 with the exhaust structure 32. In some embodiments, aligning the gas turbine mannequin 100 may include installing equipment, e.g., spacers or shims, between the foundation 36 and the foundation interface 126 of the gas turbine mannequin 100. For example, in some embodiments the equipment may include shims 44, as illustrated in FIG. 11. Such equipment may be used to adjust the location of the gas turbine mannequin 100 relative to the load 34 and/or the exhaust structure 32. In some embodiments, as shown in FIG. 12, aligning the gas turbine mannequin 100 may further include installing grout 42 on the foundation 36 underneath the foundation interface 126 of the gas turbine mannequin 100, e.g., after installing the equipment between the foundation 36 and the foundation interface 126. Grout 42 may provide a solid load path and lock in the alignment. In some embodiments, the method may further include fastening the foundation interface 126 of the gas turbine mannequin 100 to a plurality of anchor bolts 38 in the foundation 36 after aligning the gas turbine mannequin 100. When the gas turbine 10 is available, the method may then include removing the gas turbine mannequin 100 and installing the gas turbine 10. In such embodiments, the gas turbine 10 may be installed without an additional aligning step, e.g., the gas turbine 10 may be installed and aligned based on the alignment of the gas turbine mannequin 100. In other embodiments, the gas turbine 10 may be installed based on the alignment of the gas turbine mannequin 100 such that only minimal adjustment of the position of the gas turbine 10 relative to the load 34 and/or exhaust structure 32 is needed and the amount of time for alignment of the gas turbine 10 is reduced, e.g., as compared to installing the gas turbine 10 without having aligned the gas turbine mannequin 100 beforehand. For example, where aligning the gas turbine mannequin 100 includes installing equipment and/or grout 42 on the foundation 36, installing the gas turbine 10 may include placing a foundation interface of the gas turbine 10 on the equipment and/or grout 42, whereby the gas turbine 10 is substantially aligned with the load 34 and the exhaust structure 32. In particular, a shaft 22 of the gas turbine may be substantially aligned with the load 34. As used herein, terms of approximation such as "about," "generally," or "substantially," are to be understood as including within ten percent greater or less than the stated amount. For example, substantially aligned includes the offset from an external edge of the shaft 22 of the gas turbine 10 to a corresponding external edge of the load 34 at any point is within +/−10%, such as within +/−5%, such as within +/−4%, such as within +/−3%, such as within +/−2%, such as within +/−1%, such as within +/−0.5% of the overall dimension of the shaft 22, e.g., where the shaft 22 is cylindrical, the diameter of the shaft 22. Further, as used herein, such terms in the context of an angle or direction include within ten degrees greater or less than the stated angle or direction.

As mentioned above, the gas turbine mannequin 100 may include only a portion of the structure illustrated in FIGS. 2 and 3. Accordingly, some embodiments of the method may include placing the foundation interface 126 on the foundation 36, in various combinations with some or all of: connecting the gas turbine mannequin 100 to a load 34, connecting the gas turbine mannequin 100 to an exhaust structure 32, and/or connecting a pipeline 40 to one or more blind flanges 110 of the gas turbine mannequin 100. In embodiments wherein the gas turbine mannequin 100 is connected to a load 34 or an exhaust structure 32, the method may also include aligning the gas turbine mannequin 100 with any of the load 34 or exhaust structure 32 to which the gas turbine mannequin 100 is connected, e.g., when the gas turbine mannequin 100 is connected to both the load 34 and the exhaust structure 32, the aligning step may include aligning the gas turbine mannequin with both the load 34 and the exhaust structure 32 at the same time. Further, in such embodiments, when the method also includes connecting a pipeline 40, the step of connecting the pipeline 40 to the gas turbine mannequin 100 may be performed after aligning the gas turbine mannequin 100. Additionally, some embodiments may include providing the gas turbine mannequin 100 piecewise, e.g., such that the method may include placing a foundation interface 126 of a first portion of the gas turbine mannequin 100 on the foundation 36, and may further include placing a foundation interface 126 of a second portion of the gas turbine mannequin 100 on the foundation 36 and connecting the first portion of the gas turbine mannequin 100 to the second portion of the gas turbine mannequin 100.

As used herein throughout, the gas turbine mannequin 100 "simulates" the gas turbine 10 and/or portions thereof in that relative dimensions between certain key points of the gas turbine mannequin 100 correspond to those of the analogous portions of the gas turbine 10. For example, the gas turbine mannequin 100 may include the foundation interface 126 and mock rotor 114 described above, where the distances between the foundation interface 126 and mock rotor 114 of the gas turbine mannequin 100, in both the vertical direction V and the axial direction A, are the substantially the same as the vertical distance and the axial distance, respectively, between a foundation interface and a load connection point on the actual gas turbine 10. In another example, the gas turbine mannequin 100 may extend along the axial direction A between the forward end 102 and the aft end 104, with the mock rotor 114 proximate to the forward end 102 and the annular frame 120 proximate to the aft end 104 such that the axial distance between the mock rotor 114 and the annular frame 120 is substantially the same as the axial distance between a load connection point, e.g., at or proximate to a forward end of the inlet 12, and an exhaust structure connection point, e.g., at or proximate to an aft end of the exhaust section 20, on the gas turbine 10. Accordingly, in various embodiments, the gas turbine mannequin 100 may include some or all of the foundation interface 126, mock rotor 114, one or more pluralities of blind flanges 110, and annular frame 120, in various combinations, all of which simulate corresponding portions of a gas turbine with respect to their size and relative location.

Figure 4:
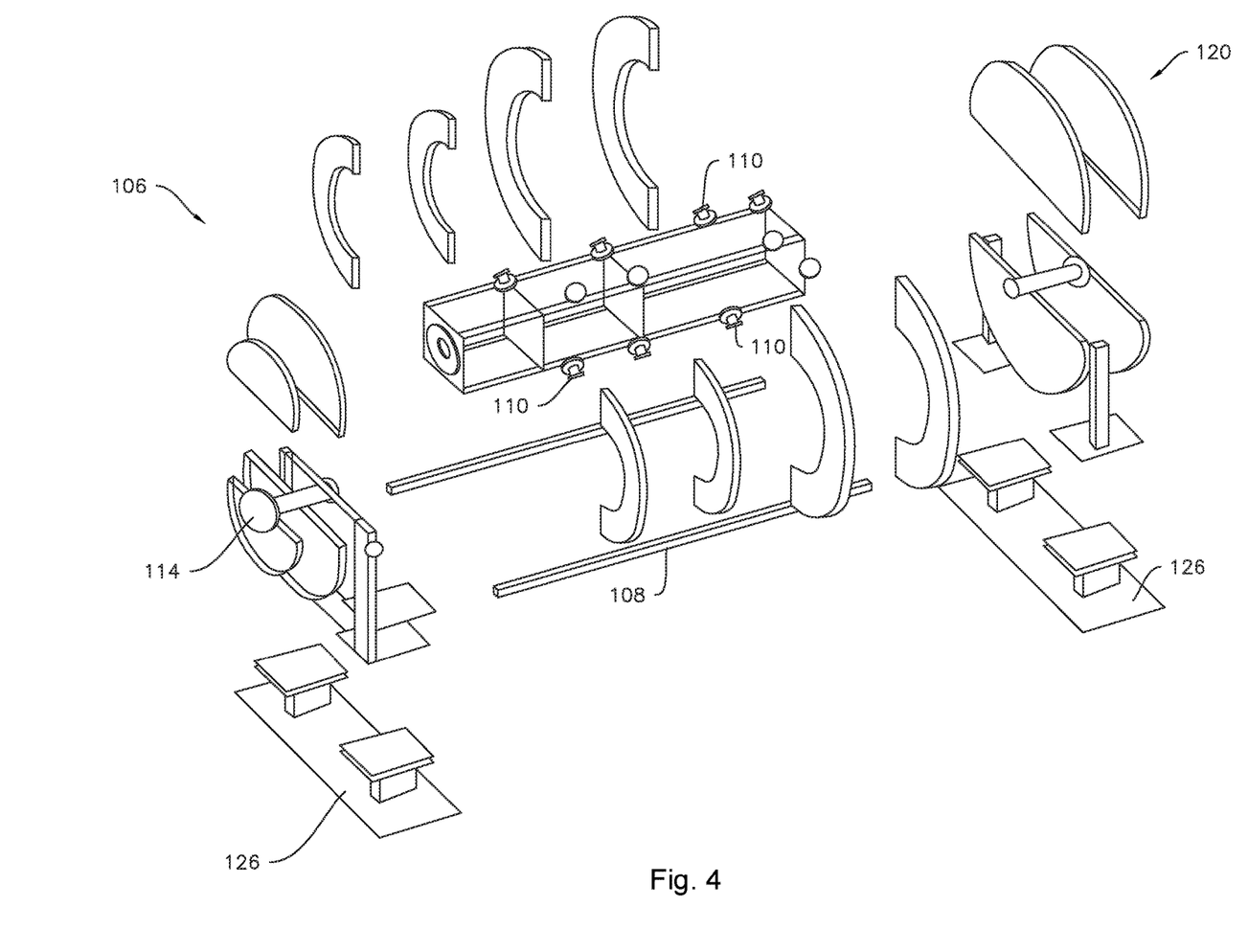
FIG. 4 is a perspective view of a gas turbine mannequin according to one or more embodiments of the present disclosure.

Although the gas turbine mannequin 100 illustrated in FIGS. 2 and 3 simulates substantially all of the gas turbine 10, e.g., from the inlet section 12 to the exhaust section 20, it is to be understood that some embodiments may include only certain portion of the gas turbine mannequin 100 in the illustrated examples. For example, the gas turbine mannequin 100 may include only a foundation interface 126 with a mock rotor 114. Such embodiments may be desired in situations where the alignment of the gas turbine 10 with the load is of particular concern. As another example, the gas turbine mannequin 100 may include only one or more of the pluralities of blind flanges 110 with a structural skeleton 106 for support. Such embodiments may be desired in situations where the pipes to build the pipelines 40 are readily available In various embodiments, the gas turbine mannequin 100 may be provided at an installation site where a gas turbine system (e.g., as illustrated in FIG. 1) is to be constructed or installed. In some embodiments, the gas turbine mannequin 100 may be delivered to the site fully assembled, e.g., as shown in FIGS. 2 and 3. In other embodiments, the gas turbine mannequin 100 may be provided as a piecewise construction, e.g., as illustrated in FIG. 4. In such embodiments, portions of the gas turbine mannequin 100 may be pre-assembled and shipped to the site for final assembly. For example, as shown in FIG. 4, the annular frame 120 may be provided to the installation site as two or four pieces rather than a collection of disconnected parts. Also as illustrated for example in FIG. 4, one or more groups of blind flanges 100 may be mounted on the structural skeleton 106 off site. Mounting the blind flanges 110 off site may advantageously permit positioning the blind flanges 110 on the structural skeleton 106 in a more controlled environment than the installation site. In still further embodiments, the gas turbine mannequin 100 may be provided as a kit of parts, e.g., with all of the elongate members 108 of the structural skeleton 106 disconnected from each other and the blind flanges 110 detached, etc., and the kit of parts may be shipped to the site for complete assembly of the gas turbine mannequin 100 in situ.

Figure 5:
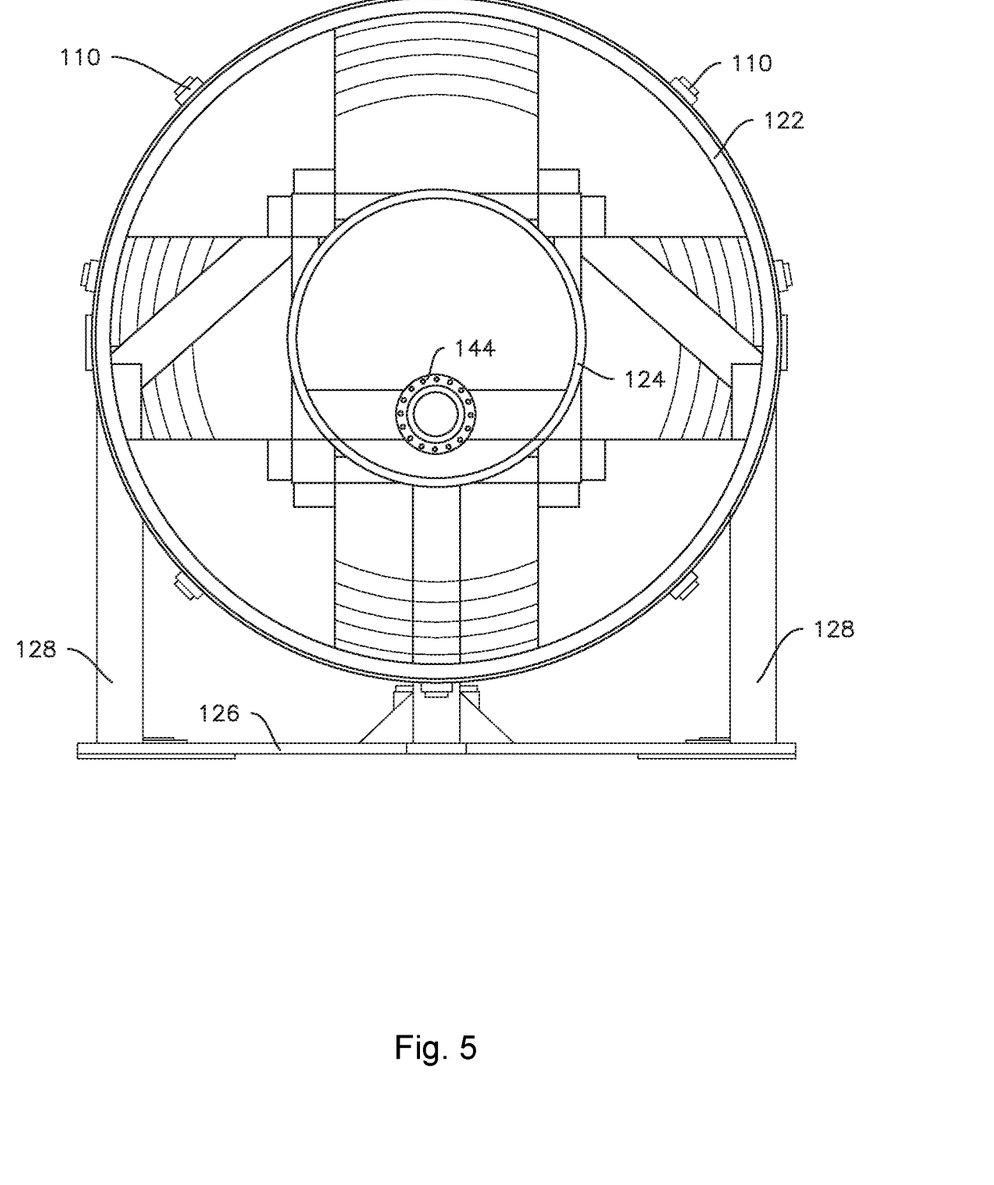
FIG. 5 is an end view of a gas turbine mannequin according to one or more embodiments of the present disclosure.

FIG. 5 provides an end view of the gas turbine mannequin 100. In particular, FIG. 5 illustrates the aft end 104 of the gas turbine mannequin 100 looking towards the forward end 102. As shown, the gas turbine mannequin 100 may include the annular frame 120 at the aft end 104. The annular frame 120 may be configured for connecting to the exhaust structure 32. In some embodiments, the annular frame 120 may include an outer ring 122 and an inner ring 124 to aid in connecting and aligning the gas turbine mannequin 100 with the exhaust structure 32. In some embodiments, the annular frame 120 may include a stub 144 to aid in connecting and aligning the gas turbine mannequin 100 with the exhaust structure 32, e.g., the stub 144 may simulate a portion of the shaft 22 as a reference point in aligning the gas turbine mannequin 100 with the exhaust structure 32 and/or the stub 144 may provide an additional connection point for connecting the gas turbine mannequin 100 to the exhaust structure 32.

Figure 6:
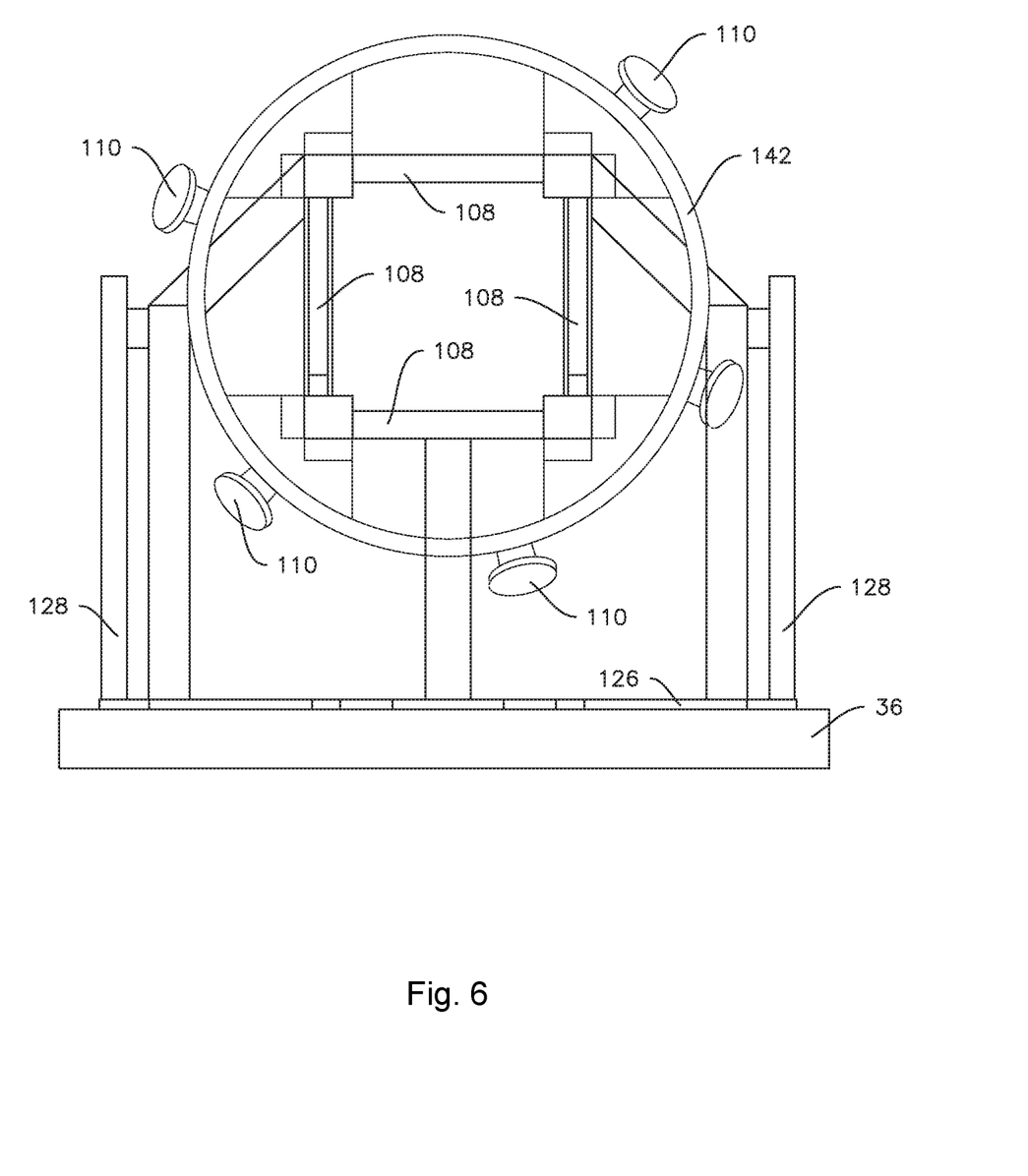
FIG. 6 is a transverse section view of a gas turbine mannequin according to one or more embodiments of the present disclosure.
Figure 7:
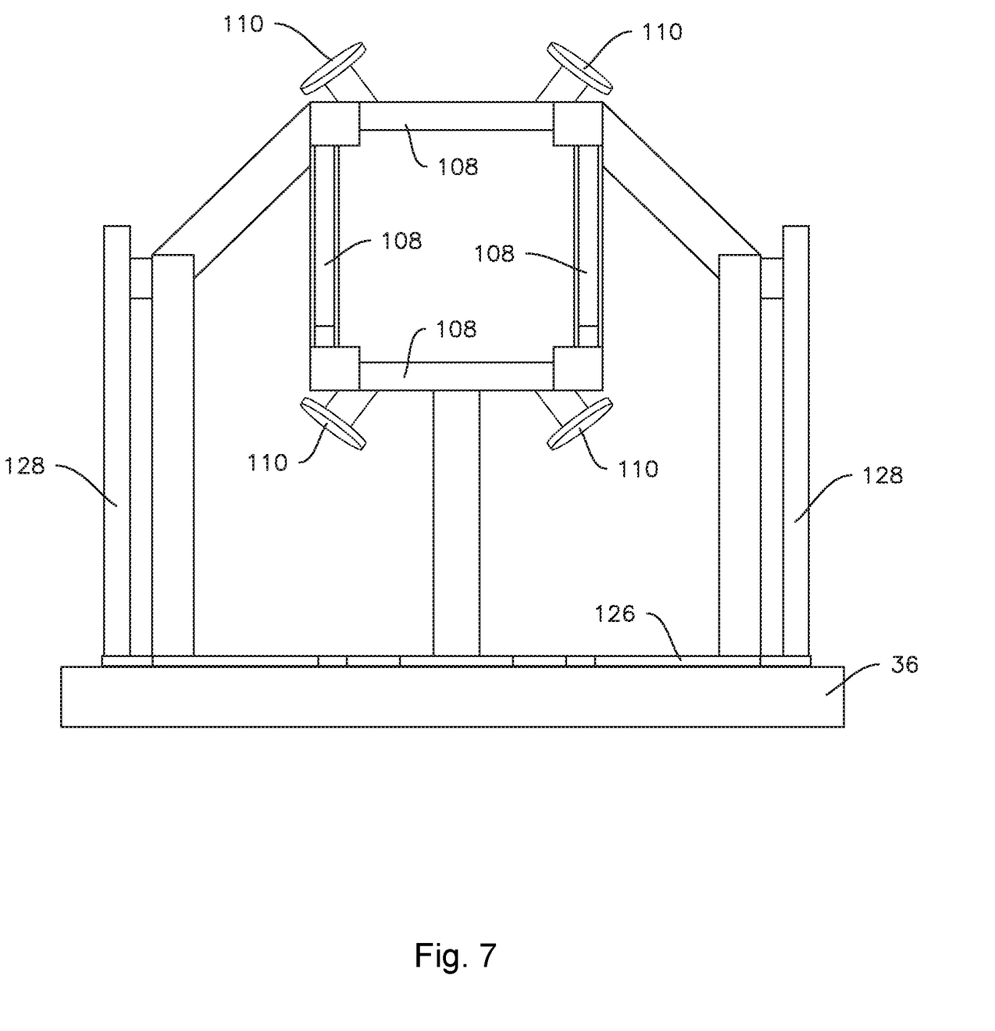
FIG. 7 is a transverse section view of a gas turbine mannequin according to one or more embodiments of the present disclosure.

FIGS. 6 and 7 provide transverse sectional views of the gas turbine mannequin 100, and in particular, FIGS. 6 and 7 illustrate example embodiments of the blind flanges 110. In some embodiments, for example as illustrated in FIG. 6, the blind flanges 110 may be mounted on a ring member 142, where the ring member 142 encircles the structural skeleton 106 at a location along the axial direction A corresponding to a connection point for a pipeline 40 when the gas turbine 10 is installed. In some embodiments, for example as illustrated in FIG. 7, the blind flanges 110 may be mounted directly on one or more elongate members 108 of the structural skeleton 106. In various embodiments, more than one axially aligned group of blind flanges 110 may be provided. For example, a first plurality of blind flanges 110 may be provided at a first axial location corresponding to a connection point for a first pipeline 40, and a second plurality of blind flanges 110 may be provided at a second axial location corresponding to a connection point for a second pipeline 40. In such embodiments, either or both of the first plurality of blind flanges 110 and the second plurality of blind flanges 110 may be connected to the structural skeleton 106 via a ring member 142 or directly mounted on a respective one of the elongate members 108. For example, both of the first plurality of blind flanges 110 and the second plurality of blind flanges 110 may be connected to the structural skeleton 106 via a ring member 142, or both of the first plurality of blind flanges 110 and the second plurality of blind flanges 110 may be directly mounted on a respective one of the elongate members 108, or some combination of both ring member 142 and directly mounting to a respective one of the elongate members 108 may be provided.

Figure 8:
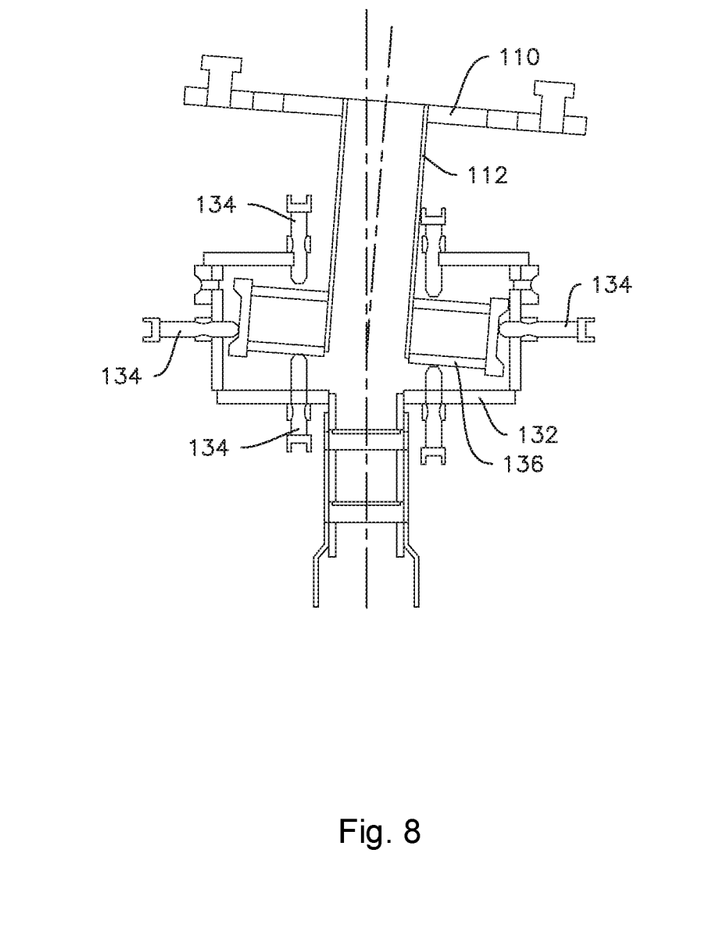
FIG. 8 is a section view of an adjustable flange for a gas turbine mannequin according to one or more embodiments of the present disclosure.
Figure 9:
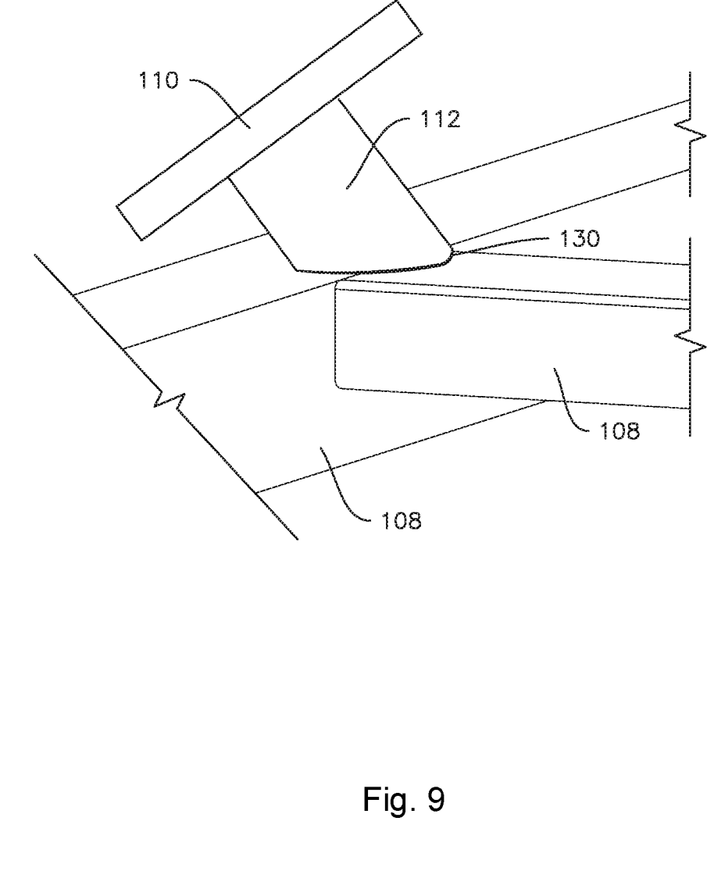
FIG. 9 is a section view of a fixed flange for a gas turbine mannequin according to one or more embodiments of the present disclosure.
Figure 10:
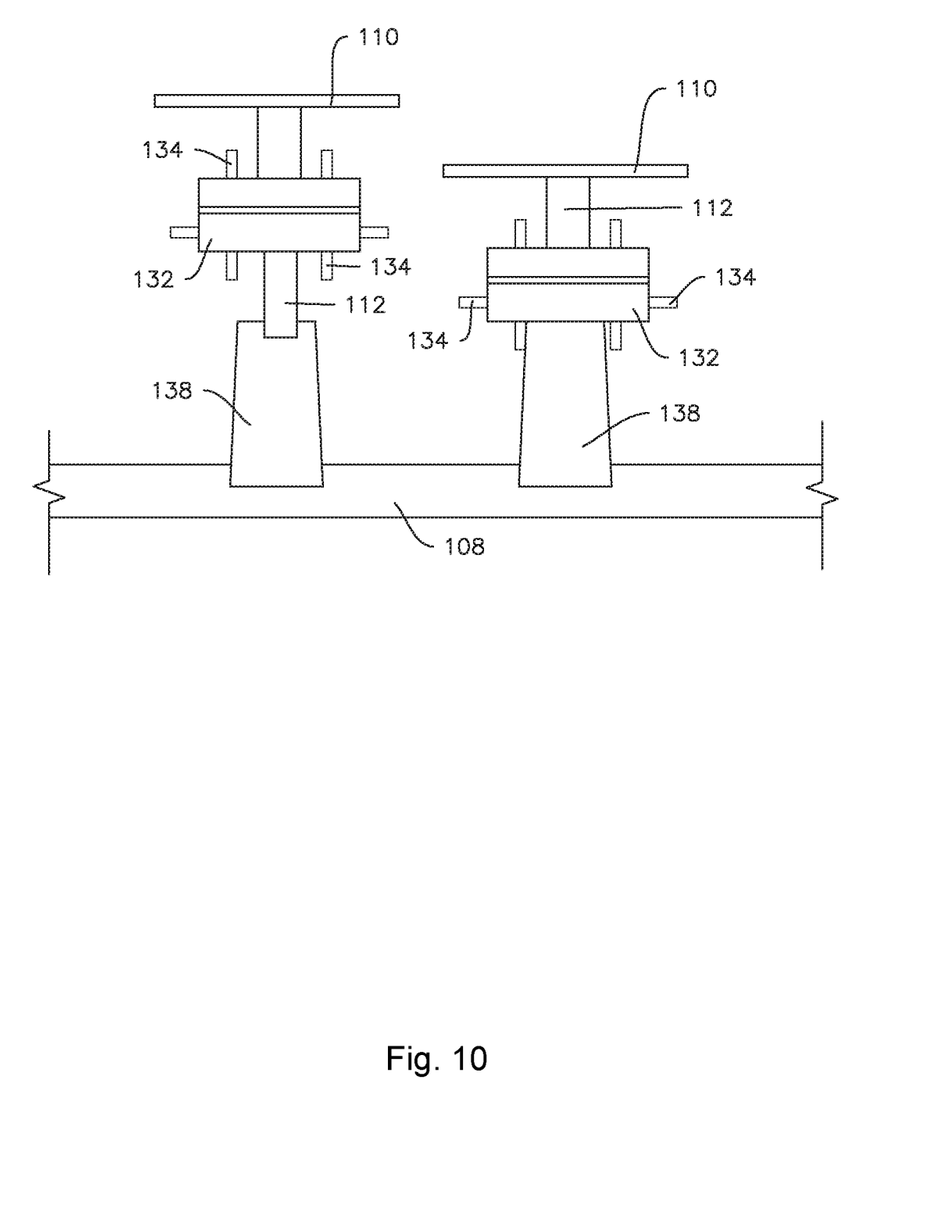
FIG. 10 is a side view of adjustable flanges for a gas turbine mannequin according to one or more embodiments of the present disclosure

In various embodiments, the blind flanges 110 may be fixed, e.g., welded, as shown in FIG. 9, or may be adjustably mounted as illustrated for example in FIGS. 8 and 10, to the ring member 142 and/or elongate members 108. As shown in FIG. 9, the blind flange 110 may include a shaft portion 112, and the shaft portion 112 may be welded to one or more of the elongate members 108, e.g., at a weld seam 130.

As illustrated for example in FIG. 8, in some embodiments the blind flange 110 may be connected to a shaft portion 112 which extends into a housing 132. An adjustment ring 136 may be provided on the shaft portion 112 at a distal end of the shaft portion 112 from the flange 110. The adjustment ring 136 may be contained within the housing 132 and internally spaced from the housing 132, such that the adjustment ring 136 can travel in all direction within the housing 132 in order to provide an adjustable flange 110 that is movable all degrees of freedom. As shown in FIG. 8, a plurality of set screws 134 may be provided in the housing 132 for positioning the adjustment ring 136 within the housing 132. As will be understood by those of skill in the art, adjusting one or more of the set screws 134 permits the position of the adjustable flange 110 to be modified. Accordingly, embodiments include methods of constructing a gas turbine system, where the method includes adjusting a position of the one or more blind flanges 110 of the gas turbine mannequin 100 prior to connecting the pipeline 40 to the one or more blind flanges 110.

FIG. 10 illustrates flanges 110 which are adjustably mounted on an elongate member 108 of the structural skeleton 106 via actuators 138 which may be configured to adjust the radial distance between a respective flange 110 and the structural skeleton 106. For example, the flanges 100 may be telescopic to extend radially outward away from the structural skeleton 106 or retract radially inwards towards the structural skeleton 106, e.g., between an extended position shown on the left in FIG. 10 and a retracted position shown on the right in FIG. 10. Any suitable actuator 138 may be used, such as but not limited to an electric actuator or a hydraulic actuator. As shown in FIG. 10, in some embodiments, the telescopically adjustable flanges 110 may also be provided with housings 132 as shown and described above with respect to the example embodiment of FIG. 8. However, it should be appreciated that such embodiments may be provided separately or in combination, e.g., the telescopically adjustable flanges 110 of the embodiment illustrated in FIG. 10 do not necessarily include the housing 132. Thus, in embodiments including adjusting a position of the one or more blind flanges 110 of the gas turbine mannequin 100 prior to connecting the pipeline 40 to the one or more blind flanges 110, adjusting the position of the one or more blind flanges 110 may include adjusting one or more set screws 134 and/or actuating an actuator 138 to adjust the position of the one or more blind flanges 110.

This written description uses examples to disclose the technology, including the best mode, and also to enable any person skilled in the art to practice the technology, including making and using any devices or systems and performing any incorporated methods. The patentable scope of the technology is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal language of the claims.

What is claimed is:

1. A method of constructing a gas turbine system, the method comprising:
    placing a foundation interface of a gas turbine mannequin on a foundation;
    aligning the gas turbine mannequin with a load;
    aligning the gas turbine mannequin with an exhaust structure;
    connecting the gas turbine mannequin to the load and the exhaust structure;
    removing the gas turbine mannequin; and
    installing a gas turbine.

2. The method of claim 1, wherein aligning the gas turbine mannequin includes installing an equipment between the foundation and the foundation interface of the gas turbine mannequin to adjust the location of the gas turbine mannequin relative to the load and the exhaust structure.

3. The method of claim 2, wherein installing the gas turbine comprises placing the foundation interface of the gas turbine on the equipment, whereby the gas turbine is substantially aligned with the load and the exhaust structure.

4. The method of claim 1, further comprising fastening the foundation interface of the gas turbine mannequin to a plurality of anchor bolts in the foundation after aligning the gas turbine mannequin.

5. The method of claim 1, wherein aligning the gas turbine mannequin with the load comprises aligning a mock rotor of the gas turbine mannequin with the load.

6. The method of claim 1, wherein aligning the gas turbine mannequin with the exhaust structure comprises aligning an annular frame of the gas turbine mannequin with the exhaust structure.

7. The method of claim 1, wherein installing the gas turbine comprises aligning the gas turbine based on the alignment of the gas turbine mannequin.

8. The method of claim 1, wherein placing the foundation interface comprises placing the foundation interface of a first portion of the gas turbine mannequin on the foundation, the method further comprising placing the foundation interface of a second portion of the gas turbine mannequin on the foundation and connecting the first portion of the gas turbine mannequin to the second portion of the gas turbine mannequin.

9. The method of claim 1, further comprising constructing a pipeline and connecting the pipeline to one or more blind flanges of the gas turbine mannequin after aligning the gas turbine mannequin with the load and the exhaust structure and prior to removing the gas turbine mannequin.

* * * * *